(12) United States Patent
Mehler et al.

(10) Patent No.: US 6,303,722 B1
(45) Date of Patent: *Oct. 16, 2001

(54) METHOD FOR PREPARING (CO)POLYMERS HAVING A NARROW MOLECULAR WEIGHT DISTRIBUTION

(75) Inventors: Christof Mehler, Ludwigshafen (DE); Thieo E. Hogen-Esch, South Pasadena, CA (US); Axel Müller, Wiesbaden (DE); Angela Zagala, Aurora, IL (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/125,972

(22) PCT Filed: Feb. 26, 1997

(86) PCT No.: PCT/EP97/00902

§ 371 Date: Dec. 10, 1998

§ 102(e) Date: Dec. 10, 1998

(87) PCT Pub. No.: WO97/31953

PCT Pub. Date: Sep. 4, 1997

(51) Int. Cl.$^7$ ........................................ C00F 4/06
(52) U.S. Cl. ........................ 526/193; 526/264; 526/265; 526/298; 526/316; 526/319; 526/328; 526/341
(58) Field of Search ............................................. 526/193

(56) References Cited

U.S. PATENT DOCUMENTS 5,610,248  3/1997  Hogen-Esch et al. ................ 526/193
6,143,847 * 11/2000 Hogen-Esch et al. ................ 526/193

OTHER PUBLICATIONS

Rev. Macromol. Chem. Phys., 1994, C34, 243.
J. Am. Chem. Soc., 1983, 104, 5706.
Macromolecules, 1988, 20, 1473.
Makromol. Chem., 1990, 191, 1657.
Makromol. Chem., Macromol. Symp., 1990, 32, 61.
Macromolecules, 1994, 27, 4902.
Polym. Bull, 1986, 16, 277.
Macromolecules, 1993, 26, 2987.
Macromolecules, 1991, 24, 6079.
Polymer Preprints, Am. Chem. Soc., 1993, 34, 566.
Agnew Chem. Int. Ed. Eng., 1988, 27, 1371.
PolymerPreprints, Am. Chem. Soc., 1991, 32, 296.
Agnew Chem. Int. Ed. Engl., 1993, 32, 716.
J. Am. Chem. Soc., 1992, 114, 4908.
Macromolecules, 1993, 26, 7134.
Macromolecules, 1992, 25, 5907.
Macromolecules, 1993, 26, 3403.
Macromolecules, 1994, 27, 2820.
Macromolecules, 1992, 25, 4457.
Macromolecules, 1994, 27, 4615.
Macromol. Symp., vol. 107, 1996, 265–283.
Die Makromolekulare Chemie, vol. 161, 1972, 139–160.
J. of Org. Chem., vol. 41, 1976, 1889–1895.

* cited by examiner

*Primary Examiner*—Bernard Lipman
(74) *Attorney, Agent, or Firm*—Keil & Weinkauf

(57) ABSTRACT

The present invention concerns a novel method for preparing polymers (preferably (meth)acrylate polymers and copolymers) having a narrow molecular weight distribution by metal-free anionic polymerization in the presence of a phosphonium salt of a nitrogen, oxygen and/or sulfur anion. The present invention also concerns block copolymer and methods of making the same using anionic polymerization in the presence of the phosphonium salt to prepare at least one block of the copolymer.

22 Claims, No Drawings

METHOD FOR PREPARING (CO)POLYMERS HAVING A NARROW MOLECULAR WEIGHT DISTRIBUTION

TECHNICAL FIELD

The present invention concerns novel block copolymers and a novel method for the anionic (co)polymerization of anionically (co)polymerizable monomers (preferably, of acrylic and/or methacrylic apolycid derivatives and of structurally related monomers) in the presence of phosphonium salts of resonance-stabilized nitrogen, oxygen or sulfur anions. The present (co)polymers, and (co)polymers produced by the present process, have a well-defined molecular weight and narrow molecular weight distribution.

BACKGROUND ART

The controlled polymerization of (meth)acrylates under moderate conditions has been at the center of interest of numerous research groups for a long time.[1] For instance, an example of one approach developed in the 1980s was group transfer polymerization (GTP), although this approach requires expensive initiators and catalysts.[2] Moreover, coordinating ligands such as metallated alkoxide[3] and lithium chloride[4] have been used in the anionic polymerization of MMA, with adequate control being achieved only at temperatures <−40 C. Other polymerization systems, such as catalytic chain-transfer polymerization,[1] "living" free-radical polymerization,[1,5] "metal-free,"[6] "coordinative,poly,"[7] "screened,"[8] "high-speed immortal"[9] and crown ether enhanced[4a,10] anionic polymerization reactions, have been successful to differing degrees in the preparation of PMMA of narrow molecular mass distribution at moderate temperatures. n-Butyl acrylate has been anionically polymerized at 20° C. by metal-free polymerization using tetrabutylammonium counterions,[6] which is sensitive due to the instability of the initiators. A distinct improvement on this method is constituted by the anionic polymerization in the presence of tetraphenylphosphonium counter-ions.[11]

1. Review Article: Davis, T., Haddleton, D., Richards, S. J. M. S. Rev. Macromol. Chem. Phys. 1994, C34, 243.

2. (a) Webster, O., Hertler, W., Sogah, D., Farnham, W. and RajanBabu, T. J. Am. Chem. Soc. 1983, 105, 5706; (b) Sogah, D., Hertler, W., Webster, O. and Cohen, G. Macromolecules 1988, 20, 1473.

3. Lochmann, L., Muller, A. Makromol. Chem. 1990, 191, 1657.

4. Teyssie, P., Fayt, R., Hautekeer, J., Jacobs, C., Jerome, R., Leemans, L., Varshney, S. Makromol. Chem., Macromol. Symp. 1990, 32, 61; (b) Wang, J., Jerome, R., Teyssie, P. Macromolecules 1994, 27, 4902.

5. (a) Otsu, T. and Tazaki, T. Polym. Bull. 1986, 16, 277; (b) Georges, M., Vereqin, R., Kazmaier, P., Hamer, G. Macromolecules 1993, 26, 2987; (c) Druliner, J. Macromolecules 1991, 24, 6079; (d) Mardare, D. and Matyjaszewski, K. Polymer Preprints (Am. Chem. Soc., Div. Polym. Chem.) 1993, 34, 566.

6. (a) Reetz, Mpoly, Knauf, T., Minet, U. and Bingel, C. Angew. Chem. Int. Ed. Engl. 1988, 27, 1371; (b) Reetz, M., Minet, U., Bingel, C. and Vogdanis, L. Polymer Preprints (Am. Chem. Soc., Div. Polym. Chem.) 1991, 32, 296; (d) Pietzonka, T. and Seebach, D. Angew. Chem. Int. Ed. Engl. 1993, 32, 716.

7. (a) Yasuda, H., Yamamoto, H., Yokota, K., Miyake, S. and Nakamura, A. J. Am. Chem. Soc. 1992, 114, 4908; (b) Yasuda, H., Yamamoto, H., Yamashita, Mpoly., Yokotd, Kpoly., Nakamura, A., Miyake, S., Kai, Y. and Kanehisa, N. Macromolecules 1993, 26, 7134.

8. Ballard, D., Bowles, R., Haddleton, D., Richards, S., Sellens, R. and Twose, D. Macromolecules 1992, 25, 5907.

9. (a) Sugimoto, H., Kuroki, M., Watanabe, T., Kawamura, C., Aida, T. and Inoue, S. Macromolecules 1993, 26, 3403; (b) Akatsuka, M., Aida, T. and Inoue, S. Macromolecules 1994, 27, 2820.

10. (a) Varshney, S., Jerome, R., Bayard, P., Jacobs, C., Fayt, R. and Teyssie, P. Macromolecules 1992, 25, 4457; (b) Wang, J., Jerome, R., Bayard, P., Baylac, L., Patin, M. and Teyssie, P. Macromolecules 1994, 27, 4615.

11. T. Hogen-Esch and A. Zagala, U.S. patent application Ser. No. 08/398,694.

OBJECTS OF THE INVENTION

Accordingly, one object of the present invention is to provide a process for the preparation of polymers and copolymers of defined molecular mass and narrow molecular mass distribution.

It is a further object of the present invention to provide a novel method for preparing polymers and copolymers which enables maximum structural variation and, at the same time, permits controlled anionic (co)polymerization of anionically polymerizable monomers at room temperature.

It is a further object of the present invention to provide a novel method for anionically producing poly(meth)acrylate (co)polymers which provides a (co)polymer having a narrow molecular weight distribution.

It is a further object of the present invention to provide a novel method for producing poly(meth)acrylate (co) polymers by anionic polymerization which provides effective control of (co)polymer molecular weight.

It is a further object of the present invention to provide a novel method for producing poly(meth)acrylate (co) polymers by anionic polymerization which can provide effective control of (co)polymer stereoregularity (e.g., isotacticity and/or syndiotacticity).

It is a further object of the present invention to provide a novel method for producing poly(meth)acrylate (co) polymers by anionic polymerization which provides the (co)polymer in good yields.

It is a further object of the present invention to provide a novel method for producing poly(meth)acrylate (co) polymers which achieves the above objects at ambient temperatures.

These and other objects, which will become apparent in the following detailed description of the preferred embodiments, have been provided by a method for producing a (co)polymer, which comprises:

reacting an anionically polymerizable monomer of the formula:

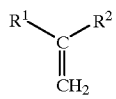

with an initiator of the formula

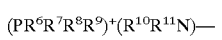

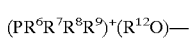

or

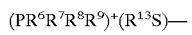

at a temperature of from −78° C. to 40° C., in a solvent in which the initiator at least partially dissolves and which does not quench the reaction, for a length of time sufficient to polymerize the monomer(s) and form a reaction mixture, wherein:

$R^1$ is selected from the group consisting of H, CN, straight-chain or branched alkyl of from 1 to 6 carbon atoms (which may be substituted with from 1 to (2n+1) halogen atoms, where n is the number of carbon atoms in the alkyl group, e.g. $CF_3$), straight-chain or branched alkenyl of from 2 to 6 carbon atoms (which may be substituted with from 1 to (2n−1) halogen atoms, where n is the number of carbon atoms in thpolye alkenyl group), straight-chain or branched alkynyl of from 2 to 6 carbon atoms (which may be substituted with from 1 to (2n−3) halogen atoms, where n is the number of carbon atoms in the alkynyl group) and aryl, and $R^2$ is independently selected from the group consisting of CN, C(=X)$R^3$, C(=X)N$R^4R^5$ and heterocyclic rings capable of stabilizing an α-anion, where X is NR (R is $C_1$–$C_{20}$ alkyl), O or S; $R^3$ is alkyl of from 1 to 20 carbon atoms, alkoxy of from 1 to 20 carbon atoms or alkylthio of from 1 to 20 carbon atoms; and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl, and any pair of $R^6$, $R^7$, $R^8$ and $R^9$ may be joined to form a ring, including the possibility that both pairs of $R^6$–$R^9$ may be joined to form a ring (preferably a 3- to 8-membered ring), $R^{10}$ and $R^{11}$ are independently alkyl of from 1 to 20 carbon atoms, cycloalkyl of from 3 to 10 carbon atoms, an aryl group, a trialkylsilyl group or an electronegative group, or $R^{10}$ and $R^{11}$ may be joined together to form a heterocycle, and $R^{12}$ is H, straight-chain or branched alkyl of from 1 to 20 carbon atoms or cycloalkyl of from 3 to 10 carbon atoms which may contain one or more remote sites of unsaturation, aryl, aralkyl or a (co)polymer radical;

$R^{13}$ is independently $R^{12}$, straight-chain or branched alkenyl of from 2 to 20 carbon atoms, or straight-chain or branched alkynyl of from 2 to 20 carbon atoms;

quenching the reaction mixture with an acyl halide, an acid anhydride or a substance containing an active hydrogen atom to form a (co)polymer; and isolating the formed (co)polymer.

BEST MODE FOR CARRYING OUT THE INVENTION

The present process can be used to make polymers and copolymers (hereinafter "(co)polymers") from a wide variety of monomers. Anionically polymerizable vinyl monomers suitable for the present process should bear at least one electron-withdrawing and/or formal negative charge-stabilizing group, such as an ester group, a cyano group, a keto group, a sulfone group, a phosphonate group, a heterocyclic ring, a phenyl ring bearing one or more electron-withdrawing and/or formal negative charge-stabilizing substituents, etc. The initiator can be any stabilized nitrogen, oxygen or sulfur anion sufficiently reactive to polymerize an anionically polymerizable monomer. One key to the present process involving the anionic, metal-free polymerization of a vinyl monomer lies in the use of a stable phosphonium counteraction.

The present invention provides (co)polymers, and particularly poly(meth)acrylates, having a relatively narrow molecular weight distribution, in quantitative yields at ambient temperatures. Molecular weights of the (co)polymers produced by the present process, which may be weight average or number average molecular weights, may be controlled by controlling the molar ratio of initiator to monomer, and may range from 500 g/mol to 300,000 g/mol, preferably from 1,000 to 200,000 g/mol, and most preferably from 2,000 to 60,000 g/mol. In the context of the present application, the term "monodisperse" refers to a (co)polymer having a weight average molecular weight ($M_w$)/number average molecular weight ($M_n$) of ≦2.0, preferably ≦1.5, and most preferably ≦1.1.

Because the present reacting step is a "living" polymerization, the process can be applied to preparation of block and multi-block copolymers. The bulky phosphonium cations are believed to prevent intramolecular cation coordination to the ante-penultimate ester carbonyl group.

Polymers produced using the present process have a variety of uses. For example, PMMA is the polymer used to make PLEXIGLAS. Furthermore, the polymers produced by the present method are sufficiently monodisperse as to provide PMMA or other polymer stanpolydards for size exclusion chromatography.

Monomers suitable for polymerization in the present method include those of the formula:

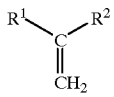

wherein:

$R^1$ is selected from the group consisting of H, CN, straight-chain or branched alkyl of from 1 to 6 carbon atoms (which may be substituted with from 1 to (2n+1) halogen, preferably fluorine, atoms, where n is the number of carbon atoms in the alkyl group e.g. $CF_3$), straight-chain or branched alkenyl of from 2 to 6 carbon atoms (which may be substituted with from 1 to (2n−1) halogen, preferably fluorine, atoms, where n is the number of carbon atoms in the alkenyl group), straight-chain or branched alkynyl of from 2 to 6 carbon atoms (which may be substituted with from 1 to (2n−3) halogen atoms, where n is the number of carbon atoms in the alkynyl group) and aryl, and $R^2$ is independently selected from the group consisting of CN, C(=X)$R^3$, C(=X)N$R^4R^5$ and negative charge stabilizing heterocyclic rings, where X is NR (R is $C_1$–$C_{20}$ alkyl), O or S; $R^3$ is alkyl of from 1 to 20 carbon atoms, alkoxy of from 1 to 20 carbon atoms or alkylthio of from 1 to 20 carbon atoms; and $R^4$ and $R^5$ are independently alkyl of from 1 to 20 carbon atoms or are joined together to form an alkylene group of from 2 to 5 carbon atoms, thus forming a 3- to 6-membered ring.

In the context of the present invention, "aryl" refers to phenyl and naphthyl, which may be aubsituted from 1 to 5 time (in the case of phenyl) or from 1 to 7 times (in the case of naphthyl) and preferably from 1 to 3 times (in both cases)

with alkyl of from 1 to 20 carbon atoms, alkyl of from 1 to 6 carbon atoms (preferably methyl) in which each of the hydrogen atoms may be independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, phenyl, halogen, $C_1$–$C_6$-dialkylamino, and phenyl which may be substituted with from 1 to 5 halogen atoms and/or $C_1$–$C_4$ alkyl groups. In the present application, "aryl" may also refer to pyridyl, preferably 2-pyridyl. More preferably, "aryl" refers to phenyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl. In the present application, "arylene" refers to arenediyl, or a divalent aryl group as defined above (i.e., an aryl group having a second substituent or a second position at which a radical exists).

In the context of the present invention, "heterocyclic rings capable of stabilizing an α-anion" refer to those heterocyclic rings which can stabilize a formal negative charge at a carbon atom covalently bound to the heterocyclic ring, such as is postulated for "living" anionic mers. Thus, the vinyl group undergoing polymerization should be attached to the heterocyclic ring such that one or more of the heteroatoms in the heterocyclic ring stabilizes the negative charge on the "living" polymer intermediate. Accordingly, suitable vinyl heterocycles include 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and any vinyl pyrazine. The vinyl heterocycles mentioned above may bear one or more (preferably 1 or 2) $C_1$–$C_6$ alkyl or alkoxy groups, cyano groups, ester groups or halogen atoms. Further, those vinyl heterocycles which, when unsubstituted, contain an N—H group are protected at that position with a conventional blocking or protecting group, such as a $C_1$–$C_6$ alkyl group, a tris-$C_1$–$C_6$ alkyl silyl group, an acyl group of the formula $R^{28}CO$ (defined below), etc.

More specifically, preferred monomers include (meth) acrylate esters of $C_1$–$C_{20}$ alcohols, acrylonitrile, cyanoacrylate esters of $C_1$–$C_{20}$ alcohols, didehydromalonate esters of $C_1$–$C_6$ alcohols, vinyl pyridines, vinyl N-alkylpyrroles, vinyl oxazoles, vinyl thiazoles, vinyl pyrimidines and vinyl imidazoles, vinyl ketones in which the -carbon atom of the alkyl group does not bear a hydrogen atom (e.g., vinyl $C_1$–$C_6$-alkyl ketones in which both -hydrogens are replaced with $C_1$–$C_4$ alkyl, halogen, etc., or a vinyl phenyl ketone in which the phenyl may be substituted with 1–5 $C_1$–$C_6$-alkyl groups), and styrenes bearing electron-donating and electron-withdrawing groups on the phenyl ring (e.g., one or more halogen atoms, nitro groups, $C_1$–$C_6$ ester groups or cyano groups). The most preferred monomer is methyl methacrylate (MMA).

Suitable initiators include those of the formula:

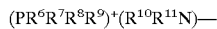

$(PR^6R^7R^8R^9)^+(R^{10}R^{11}N)$—

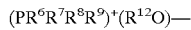

$(PR^6R^7R^8R^9)^+(R^{12}O)$— or

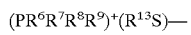

$(PR^6R^7R^8R^9)^+(R^{13}S)$— wherein:

$R^6$, $R^7$, $R^8$ and $R^9$ are independently alkyl of from 1 to 20 carbon atoms, aryl (as defined above) or aralkyl, $R^{10}$ and $R^{11}$ are independently alkyl of from 1 to 20 carbon atoms, cycloalkyl of from 3 to 10 carbon atoms, an aryl group, an electronegative group or are joined to form a heterocyclic ring, $R^{12}$ is H, straight-chain or branched alkyl of from 1 to 20 carbon atoms or cycloalkyl of from 3 to 10 carbon atoms which may contain one or more remote sites of unsaturablon, aryl, aralkyl or a (co)polymer radical, and $R^{13}$ is independently $R^{12}$, straight-chain or branched alkenyl of from 2 to 20 carbon atoms, or straight-chain or branched alkynyl of from 2 to 20 carbon atoms.

In the context of the present invention, "alkyl of from 1 to 20 carbon atoms containing one or more remote sites of unsaturation" refers to such an alkyl group having one or more carbon-carbon double bonds and/or triple bonds at positions no closer than two carbon atoms from the atom to which the alkyl group is bound (e.g., a β,γ-double bond). Examples of such a group include a prop-2-enyl or but-2-enyl group.

In the context of the present invention, "aralkyl" means aryl-substituted alkyl. Preferably, "aralky" is an aryl-substituted $C_1$–$C_{20}$-alkyl group, more preferably an aryl-substituted $C_1$–$C_6$-alkyl group.

Preferably, when one or more of $R^6$, $R^7$, $R^8$ and $R^9$ are aryl or aralkyl, the aryl moiety is phenyl, naphthyl, phenyl having from 1 to 5 substituents or naphthyl having from 1 to 7 substituents, the substituents being independently selected from the group consisting of alkyl of from 1 to 6 carbon atoms, alkoxy of from 1 to 6 carbon atoms, alkylthio of from 1 to 6 carbon atoms and $NR^{14}R^{15}$ in which $R^{14}$ and $R^{15}$ are independently alkyl of from 1 to 6 carbon atoms. Most preferably, each of $R^6$, $R^7$, $R^8$ and $R^9$ is phenyl.

Preferably, $R^{10}$ and $R^{11}$ are independently an electronegative group (as defined below), straight-chain or branched alkyl of from 1 to 6 carbon atoms, cycloalkyl of from 5 to 6 carbon atoms, tri-methylsilyl, dimethyl-t-butylsilyl, dimethyl-t-hexylsilyl, phenyl or phenyl having from 1 to 3 substituents selected from the group consisting of alkyl of from 1 to 6 carbon atoms, alkoxy of from 1 to 4 carbon atoms, phenyl and halogen.

In the context of the present invention, an "electronegative group" preferably includes groups of the formula —C(O)OR, —C(O)H, —C(O)N(R)$_2$, —C(O)SR, —CN, —S(O)R, —SO$_2$R, —SO$_3$R, —NO$_2$, —P(O)(OR)$_2$, —P(O)(R)$_2$, —P(O)(OR)(R), —P(O)(OR'O), —P(O) (NR$_2$)(R), —P(O)(NR$_2$)$_2$ and —P(O)((NR)R'(NR), where R is (independently if more than one R group is present) alkyl or aryl, preferably $C_1$–$C_6$ alkyl, benzyl or phenyl, and R' is alkylene or arylene, preferably $C_2$–$C_4$ alkylene or 1,2-phenylene. More preferred electronegative groups includes groups of the formula —C(O) OR, —C(O)H, —C(O)N(R)$_2$, —C(O)SR, —CN, —SO$_2$R, —NO$_2$, and —P(O)(OR)$_2$, where R is (independently if more than one R group is present) $C_1$–$C_4$ alkyl, Examples of $R^{10}$ and $R^{11}$ being joined together to form a heterocyclic ring include, for example, the following, which may be substituted or unsubstituted:

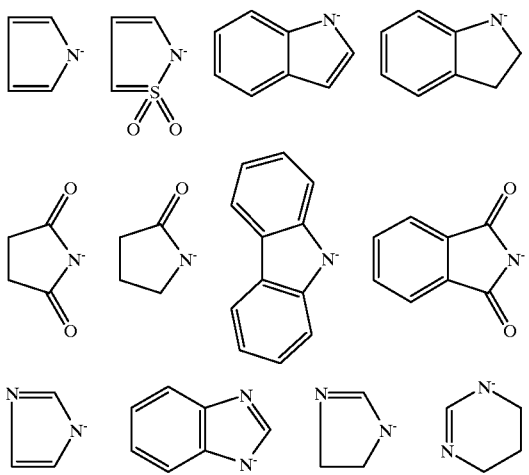

Examples of substituents suitable for substituted $R^{10}$ and $R^{11}$ heterocyclic rings include, for example, alkyl, phenyl, vinyl, halogen, nitro or cyano, which may be attached in each case to one or more of the different carbon atoms of the heterocyclic ring.

$R^{12}$ is alkyl or cycloalkyl which may be remotely unsaturated, aryl, aralkyl or a group capable of stabilizing an oxyanion or sulfur anion. $R^{13}$ is $R^{12}$, straight-chain or branched alkenyl of from 2 to 20 carbon atoms, or straight-chain or branched alkynyl of from 2 to 20 carbon atoms. Preferably, $R^{13}$ is a group of the formula —$CR^{16}$=$CR^{17}R^{18}$, where $R^{16}$, $R^{17}$ and $R^{18}$ independently are H, alkyl, aryl, alkoxy or phenoxy, and more preferably, H, alkyl of from 1 to 6 carbon atoms, phenyl, or phenyl having from 1 to 3 substituents selected from the group consisting of alkyl of from 1 to 6 carbon atoms, alkoxy of from 1 to 4 carbon atoms, phenyl and halogen.

These initiators can be conveniently prepared by cation exchange (metathesis) at −78° C. from the corresponding (a) alkali metal salts of nitrogen (amide), oxygen or sulfur anions and (b) phosphonium halide salts. The alkali metal amide, oxide (alcoholate) or sulfide (thiolate) salts can be prepared in accordance with known procedures (e.g., treatment of a compound of the formula $R^{10}R^{11}NH$, $R^{12}OH$ or $R^{13}SH$ with an alkali metal hydride reagent; direct treatment of the compound of the formula $R^{10}R^{11}NH$, $R^{12}OH$ or $R^{13}SH$ with an alkali metal; etc.). Alkali metals include lithium, sodium, potassium, rubidium and cesium, preferably potassium, rubidium and cesium, and most preferably potassium Many phosphonium halide reagents are commercially available. Others can be made by reacting a phosphine (i.e., a compound of the formula $PR^6R^7R^8$) with an alkyl or aryl halide of the formula $R^9X$ in accordance with known methods and procedures.

The alkali metal halide salt formed as a result of cation exchange can be filtered prior to use of the initiator in polymerization, but filtration is not necessary for polymerization to be successful.

Dianions are also appropriate initiators. Such initiators can be prepared from, for example, a diamine, a diol or dithiol, which is then metathesized with a tetrasubstituted phosphonium halide to provide an initiator of the formula:

$[(PR^6R^7R^8R^9)^+]_2(R^{10}NR^{11'}NR^{10})^{2-}$ $[(PR^6R^7R^8R^9)^+]_2(OR^{12'}O)^{2-}$ or $[(PR^6R^7R^8R^9)^+]_2(SR^{13'}S)^{2-}$ where $R^6$, $R^7$, $R^8$, $R^9$ and $R^{10}$ as defined above, and $R^{11'}$, $R^{12'}$ and $R^{13'}$ are divalent forms of the monovalent groups described above for $R^{11}$, $R^{12}$ and $R^{13}$. Such initiators can be used in the process of the present invention to make a block copolymer having, for example, a first, central (meth) acrylate or acrylonitrile block, and second, distinct (meth) acrylate or acrylonitrile blocks at the ends of the first, central block.

The present invention is thus also concerned with block copolymers of the formula:

B-A-($R^{10}NR^{11'}NR^{10}$)-A-B

B-A-($OR^{12'}O$)-A-B

B-A-($SR^{13'}S$)-A-B

C-B-A-($R^{10}NR^{11'}NR^{10}$)-A-B-C

C-B-A-($OR^{12'}O$)-A-B-C

C-B-A-($SR^{13'}S$)-A-B-C etc. (i.e., with successive blocks attached to each end), where A, B and C are distinct (copolymer blocks produced by anionic polymerization of one or more monomers of the formula:

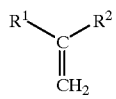

where $R^1$ and $R^2$ are as defined above, using at least one of the present phosphonium salts of nitrogen-, oxygen- and sulfur-based anions.

Branch(co)polymers having three or more chains can be prepared from, for example, appropriate phosphonium salts of compounds having three or more nitrogen, oxygen and sulfur anions (so-called "multi-anionic" initiators), such as tris-, tetra-, penta- or hexa(hydroxymethyl)benzene, glycerol, erythritol, diethylene triamine, triethylene tetraamine, dithioerythritol, dithiothreitol, trihydroxycyclohexane or pentose or hexose sugars (which may contain one or more protecting groups, such as tri-$C_1$–$C_4$-alkylsilyl, acyl e.g. $C_1$–$C_6$ alkylcarbonyl, triphenylmethyl, etc.). Thus, general initiators of the formulas $[(PR^6R^7R^8R^9)^+]_x R^{11''}$—(—N—$R^{10}$)$_x$ $[(PR^6R^7R^8R^9)^+]_x R^{12''}$—(—O—)$_x$ or $[(PR^6R^7R^8R^9)^+]_x R^{13''}$—(—S—)$_x$ can be used in the present method, where x can be at least one, preferably from 1 to 6. A preferred initiator is one in which x is 2, $R^{11''}$ is $R^{11'}$, $R^{12''}$ is $R^{12'}$ and $R^{13''}$ is $R^{13'}$, but the most preferred initiator is one in which x is 1, $R^{11''}$ is $R^{11}$, $R^{12''}$ is $R^{12}$ and $R^{13''}$ is $R^{13}$.

Triblock copolymers can be prepared from dianionic initiators described above by reacting the dianionic initiator with a first monomer to prepare a "living" anionic first block, followed by reacting the "living" anionic first block with a second monomer to provide terminal blocks on each end of the "living" first block. Thus, the present invention also concerns a method for preparing a triblock copolymer, comprising:

reacting a first monomer of the formula:

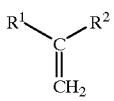

with an initiator of the formula

[(PR$^6$R$^7$R$^8$R$^9$)$^+$]$_2$ (R$^{10}$NR$^{11'}$NR$^{10}$)$^{2-}$

[(PR$^6$R$^7$R$^8$R$^9$)$^+$]$_2$ (OR$^{12'}$O)$^{2-}$ or

[(PR$^6$R$^7$R$^8$R$^9$)$^+$]$_2$ (SR$^{13'}$S)$^{2-}$ at a temperature of from −78° C. to 40° C., in a solvent in which the initiator at least partially dissolves and which does not quench the reaction, for a length of time sufficient to merize the first monomer, wherein:

R$^1$ is selected from the group consisting of H, CN, alkyl of from 1 to 6 carbon atoms (which may be halogenated as described above) and aryl, R$^2$ is independently selected from the group consisting of CN, P(=X)R$^3$, C(=X)NR$^4$R$^5$ and heterocyclic rings capable of stabilizing an α-anion, where X is NR (R is C$_1$–C$_{20}$ alkyl), O or S, R$^3$ is alkyl of from 1 to 20 carbon atoms, alkoxy of from 1 to 20 carbon atoms or alkylthio of from 1 to 20 carbon atoms, and R$^4$ and R$^5$ are independently alkyl of from 1 to 20 carbon atoms or are joined together to form an alkylene group of from 2 to 5 carbon atoms, thus forming a 3- to 6-membered ring;

R$^6$, R$^7$, R$^8$ and R$^9$ are independently alkyl of from 1 to 20 carbon atoms, aryl or aralkyl (wherein any pair of R$^6$, R$^7$, R$^8$ and R$^9$ may be joined to form a ring, including the possibility that both pairs of R$^6$–R$^9$ may be joined to form a ring preferably a 3- to 8-membered ring), and R$^{10}$ and R$^{11}$ are independently alkyl of from 1 to 20 carbon atoms, cycloalkyl of from 3 to 10 carbon atom, an aryl group, a tri-alkylsilyl group or an electronegative group, or R$^{10}$ and R$^{11}$ may be joined together to form a heterocycle, R$^{12}$ is H, alkyl of from 1 to 20 carbon atoms or cycloalkyl of from 3 to 10 carbon atoms which may contain one or more remote sites of unsaturation, aryl or a (co)polymer radical, and R$^{13}$ is R$^{12}$, straight-chain or branched alkenyl of from 2 to 20 carbon atoms, or straight-chain or branched alkynyl of from 2 to 20 carbon atoms;

adding a second monomer of the formula:

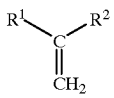

where R$^1$ and R$^2$ are as defined above, the second monomer being distinct from the first monomer, at a temperature of from −78° C. to 40° C., and reacting for a length of time sufficient to form a tri-block (co)polymer intermediate, quenching the triblock (copolymer intermediate with an acyl halide, an acid anhydride or a substance containing an active hydrogen atom to form a triblock (co)polymer; and isolating the formed triblock (co)polymer.

Successive blocks can be added to each end of the "living" anionic chain by successively adding different monomers or by changing reaction conditions appropriately (e.g., lowering the reaction temperature to increase or otherwise alter stereoregularity) after the first "adding" step above, but prior to quenching.

Polymeric anions can be used for living polymerization of a polymer, or for preparation of a block copolymer. For example, an organometal reagent-initiated (e.g., a C$_1$–C$_4$-alkyllithium-initiated) polymerization of an anionically polymerizable monomer (e.g., styrene) can be conducted in accordance with known methods to provide a "living" meric anion. Suitable monomers for preparation of such a "living" (co)polymeric anion include styrene, α-methylstyrene, styrene or α-methylstyrene having 1 to 5 (preferably 1 to 3, most preferably 1) C$_1$–C$_4$-alkyl and/or C$_1$–C$_4$-alkoxy substituents on the phenyl ring, butadiene, isoprene, dimethylbutadiene, or mixtures thereof. Such a "living" meric anion can be reacted with, for example, an aziridine, an epoxide or an episulfide to form a (co)polymeric initiator of the formula:

where R$^{23}$ is acyl (preferably alkylcarbonyl, cycloalkylcarbonyl, arylcarbonyl or aralkylcarbonyl, where the alkyl, cycloalkyl, aryl and aralkyl moieties of the alkylcarbonyl, cycloalkylcarbonyl, arylcarbonyl and aralkylcarbonyl groups are as defined above), and R$^{19}$, R$^{20}$, R$^{21}$ and R$^{22}$ are independently selected from the group consisting of H, straight-chain or branched alkyl of from 1 to 20 carbon atoms, straight-chain or branched alkyl of from 1 to 20 carbon atoms substituted with from 1 to (2n+1) halogen atoms (where n is the number of carbon atoms in the alkyl group), cycloalkyl of from 3 to 10 carbon atoms, straight-chain or branched alkenyl of from 2 to 20 carbon atoms, straight-chain or branched alkenyl of from 2 to 20 carbon atoms substituted with from 1 to (2n−1) halogen atoms (where n is tha numher of carbon atoms in the alkenyl group), straight-chain or branched alkynyl of from 2 to 20 carbon atoms, straight-chain or branched alkynyl of from 2 to 20 carbon atoms substituted with from 1 to (2n−3) halogen atoms (where n is number of carbon atoms in the alkynyl group), aryl, aralkyl, heterocyclyl, halogen, and cyano. Preferably, R$^{19}$ and R$^{20}$ are H, and R$^{21}$ and R$^{22}$ are independently selected from the group consisting of H, straight-chain or branched alkyl of from 1 to 10 carbon atoms (which may be substituted with from 1 to (2n+1) halogen atoms, where n is the number of carbon atoms in the alkyl group), cycloalkyl of from 3 to 6 carbon atoms, straight-chain or branched alkenyl of from 2 to 6 carbon atoms (which may be substituted with from 1 to (2n−1) halogen atoms, where n is the number of carbon atoms in the alkenyl group), phenyl, or phenyl having from 1 to 3 substituents selected from the group consisting of alkyl of from 1 to 6 carbon atoms, alkoxy of from 1 to 4 carbon atoms, phenyl and halogen. Further, any two of R$^{19}$, R$^{20}$, R$^{21}$ and R$^{22}$ may be joined to form an alkylenyl group of from 1 to 6 carbon atoms and thus form a cycloalkylenyl ring of from 3 to 8 members.

The (co)polymeric initiator is then used to initiate the polymerization of the next anionically polymerizable comonomer (preferably of the formula R$^1$R$^2$C=CH$_2$, described above). This initiator can be used in the process of the present invention to make a block copolymer having, for example, a first polystyrene block and a second (meth) acrylate or acrylonitrile block.

Thus, the present invention also encompasses a method for preparing a block (co)polymer, comprising the steps of:

anionically polymerizing one or more first monomers to form a (co)polymer anion;

reacting the (co)polymer anion with a compound of the formula

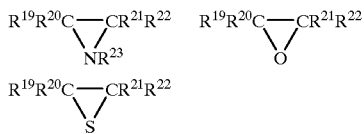

where $R^{23}$ is acyl (as defined above), and $R^{19}$, $R^{20}$, $R^{21}$ and $R^{22}$ are as defined above to form a (co)polymer-amide, (co)polymer-oxide or (co)polymer-sulfide anion;

metathesizing the (co)polymer-amide, (co)polymer-oxide or (co)polymer-sulfide anion with a phosphonium salt of the formula:

$(PR^6R^7R^8R^9)^+X^-$ where X is an inorganic anion (preferably selected from the group consisting of a halide, nitrate, nitrite, borate, tetraphenyl borate $Ph_4B^-$, tosylate $p-H_3CC_6H_4SO_3^-$, one-half equivalent of sulfite or "$(SO_3)_{0.5}$", trifluoromethanesulfonate, one-half equivalent of sulfate or "$(SO_4)_{0.5}$", one-third equivalent of phosphate for "$(PO_4)_{0.33}$" and one-half equivalent of carbonate or "$(CO_3)_{0.5}$", and $R^6$, $R^7$, $R^8$ and $R^9$ are as defined above (and wherein any pair of $R^6$, $R^7$, $R^8$ and $R^9$ may be joined to form a ring, including the possibility that both pairs of $R^6$–$R^9$ may be joined to form a ring preferably a 3- to 8-membered ring), to provide an initiator;

reacting the initiator with one or more monomers of the formula:

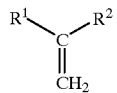

at a temperature of from −78° C. to 40° C., in a solvent in which the initiator at least partially dissolves and which does not quench the reaction, for a length of time sufficient to copolymerize the first monomer, wherein $R^1$ and $R^2$ are as defined above, to form a reaction mixture;

quenching the reaction mixture with an acyl halide, an acid anhydride or a substance containing an active hydrogen atom to form a block (co)polymer; and isolating the formed block (co)polymer.

The present invention is thus also concerned with block copolymers of the formula:

(co)copolymer-$(CR^{19}R^{20}CR^{21}R^{22}NR^{23})$-A (co)copolymer-$(CR^{19}R^{20}CR^{21}R^{22}O)$-A (co)polymer-$(CR^{19}R^{20}CR^{21}R^{22}S)$-A where the (co)polymer is one produced by anionic polymerization (preferably of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene, or mixtures thereof), $R^{19}$, $R^{20}$, $R^{21}$, $R^{22}$ and $R^{23}$ are as defined above, and A is one or more distinct (co)polymer blocks of one or more monomers of the formula:

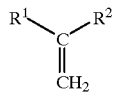

where $R^1$ and $R^2$ are as defined above.

The weight or number average molecular weight of a block in the present block (co)polymers may range from 300 to 500,000 g/mol, more preferably 500 to 300,000 g/mol, and most preferably 1,000 to 100,000 g/mol. Similar to the monodisperse (co)polymer described above, the weight or number average molecular weight of block B in the present triblock copolymer may range from 500 g/mol to 300,000 g/mol, preferably from 1,000 to 200,000 g/mol, and more preferably from 2,000 to 60,000 g/mol. The present block copolymers are also preferably "monodisperse" in that they may have a $M_w/M_n$ value of ≦2.0, preferably ≦1.5, and most preferably ≦1.1. Successive blocks may also be of the same monomer, but have a different tacticity.

In a further embodiment, a triblock copolymer may be prepared from the dimeric dianion of an aromatic vinyl monomer such as styrene or α-methylstyrene, prepared, for example, by reacting the aromatic vinyl monomer with sodium or lithium naphthalide (in a known manner). The dimeric dianion of the aromatic vinyl monomer may be subsequently reacted with a monomer selected from the group consisting of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene and mixtures thereof to prepare a dianion of a first polymer block. The first copolymer block dianion can then be reacted with an aziridine, an epoxide or an episulfide in accordance with the above-described method, and the remaining steps of the method (metathesizing with a phosphonium salt, reacting with one or more monomers of the formula $CH_2$=$CR^1R^2$, quenching and isolating) can then be conducted to prepare a triblock copolymer in which the inner block is a (co)polymer of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene or a mixture thereof, and the outer blocks are of one or more monomers of the formula $CH_2$=$CR^1R^2$.

Suitable solvents for the reacting or polymerizing step of the present method (in any of its various embodiments) include ethers, cyclic ethers, aromatic hydrocarbon solvents, and mixtures thereof. Suitable ethers include compounds of the formula $R^{24}OR^{25}$, in which each of $R^{24}$ and $R^{25}$ is independently an alkyl group of from 1 to 6 carbon atoms which may be further substituted with a $C_1$–$C_4$-alkoxy group. Preferably, when one of $R^{24}$ and $R^{25}$ is methyl, the other of $R^{24}$ and $R^{25}$ is alkyl of from 4 to 6 carbon atoms or $C_1$–$C_4$-alkoxyethyl. Examples include diethyl ether, ethyl propyl ether, dipropyl ether, methyl t-butyl ether, di-t-butyl ether, glyme (dimethoxyethane), diglyme (diethylene glycol, dimethyl ether), etc.

Suitable cyclic ethers include THF and dioxane. Suitable aromatic hydrocarbon solvents include benzene, toluene, o-xylene, m-xylene p-xylene and any izqmer or mixture of isomerx of cumene.

The initiator should be at least partially soluble in the solvent. Thus, when using an aromatic solvent, the reaction may be advantageously promoted by increasing the lipophilicity of the initiator (e.g., having a $C_6$–$C_{20}$-alkyl substituent in one or both of the ionic components, preferably at least in the phosphonium cation). For example, if the initiator has the formula $Ar_4P^+ Ar'_2N^-$ or $Ar_4P^+ Ar'O^-$, where each Ar and Ar' are independently an aryl group, one or more of the Ar and Ar' groups should include one or more alkyl substituents having from 1 to 20 carbon atoms, preferably having from 4 to 20 carbon atoms and more preferably having from 6 to 20 carbon atoms. To avoid molecular weight distribution broadening, the copolymer should also be soluble in the solvent selected.

The polymerization may be conducted by dropwise addition of a solution of monomer (e.g., 0.01–5.0 M, preferably 0.1–2.0 M and most preferably about 1.0 M in THF) into a solution of initiator in THF (e.g., from $10^{-5}$ to $10^{-1}$, preferably from $10^{-4}$ to $10^{-2}$ and most preferably about 1–2× $10^{-3}$ molar equivalents with respect to moles of monomer).

Although the present reaction may be conducted at a temperature of from –78° C. to 40° C., the preferred range is from –20° C. to 30° C., more preferably from 0° C. to 25° C., and most preferably from 15° C. to 25° C.

The organic phosphonium cation is believed to facilitate the formation of narrow MWD (co)polymers at ambient temperature by reducing the rate of termination (e.g., by intramolecular Claisen condensation reaction), relative to the rate of propagation.

It is further believed that there exists an equilibrium between a dormant species (phosphorous ylid, probably present in an amount of more than 95% of all species) and a polymerization active species (phosphonium enolate, probably present in an amount of less than 5% of all species) such as is indicated in the scheme below:

is a fluorine, chlorine, bromine or iodine atom; and $R^{27}$ is alkyl of from 1 to 4 carbon atoms. Preferred acyl halides include benzenesulfonyl chloride, toluenesulfonyl chloride and those of the formula $R^{28}COX$, in which $R^{28}$ is alkyl of from 1 to 4 carbon atoms, vinyl, 2-propenyl or phenyl, and X is chlorine (e.g., acetyl chloride, propionyl chloride, (meth)acryloyl chloride and benzoyl chloride). The most preferred acyl halide is methacryloyl chloride.

Suitable acid anhydrides include those of the formula $(R^{28}CO)_2O$, where $R^{28}$ is as defined above. Preferred acid anhydrides include acetic anhydride, propionic anhydride, and (meth)acrylic anhydride.

Active hydrogen atom-containing substances include those substances in which a hydrogen atom is attached to a heteroatom, and which have a $PK_a$ less than the protonated nitrogen, oxygen or sulfur anion of the initiator. Such compounds include water, alcohols of from 1 to 6 carbon atoms, aqueous solutions of ammonium salts (e.g., ammonium halide or ammonium carbonates), carboxylic and mineral acids (e.g., acetic acid, hydrochloric acid, etc.) or an aqueous solution thereof, etc., with methanol being the most preferred quenching agent.

In some cases, up to 10 equivalents of alcohol or water may be necessary to quench the polymerization. Thus, it is believed that small quantities of protic solvents may be tolerated in the present method. As a consequence, it may not be necessary to rigorously purify and dry all starting materials prior to use.

The present isolating step is conducted in accordance with known procedures and methods, such as precipitating the (co)polymer and filtering the precipitated (co)polymer. Precipitation can be conducted using a suitable $C_5$–$C_8$-alkane or cycloalkane solvent, such as hexane, heptane, cyclohexane, pentane, mineral spirits, or a $C_1$–$C_6$-alcohol, such as methanol, ethanol or isopropanol, or any mixture of suitable

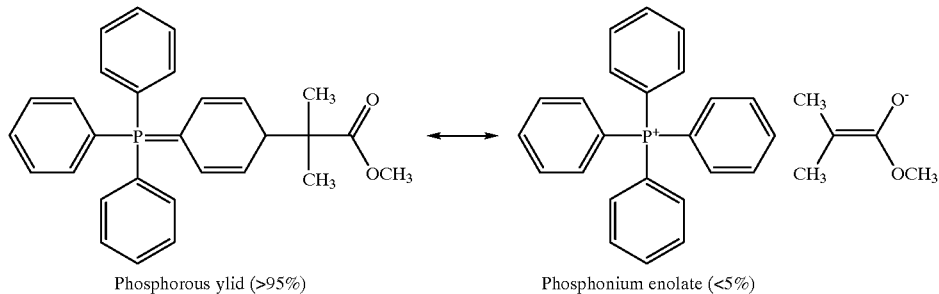

Phosphorous ylid (>95%)　　　　　Phosphonium enolate (<5%)

Termination of the polymerization using an appropriate quenching reagent rapidly gives a light yellow solution. Suitable quenching reagents in the present process include acyl halides, acid anhydrides and substances containing an active hydrogen atom.

Suitable acyl halides include halides, preferably chlorides, of organic acids, including carboxylic acids, sulfonic acids, phosphonic acids, etc. Such acids are suitably of the formula $R^{26}COX$, $R^{26}SO_2X$ and $R^{26}P(=O)(OR^{27})X$, in which $R^{26}$ is alkyl of from 1 to 20 carbon atoms in which each of the hydrogen atoms may be independently replaced by a halide (preferably a fluoride or a chloride), alkenyl of from 2 to 20 carbon atoms, alkynyl of from 1 to 10 carbon atoms, phenyl which may be substituted with from 1 to 5 halogen atoms or alkyl groups of from 1 to 4 carbon atoms, or aralkyl in which the aryl group is phenyl or substituted phenyl and the alkyl group is from 1 to 6 carbon atoms; X solvents. Preferably, the solvent for precipitating is hexane, mixtures of hexanes, or methanol.

The precipitated (co)polymer can be filtered by gravity or by vacuum filtration, in accordance with known methods (e.g., using a Büchner funnel and an aspirator). The copolymer can then be washed with the solvent used to precipitate the copolymer, if desired. The steps of precipitating, filtering and washing may be repeated, as desired.

Once isolated, the (co)polymer may be dried by drawing air through the (co)polymer, by vacuum, etc., in accordance with known methods (preferably by vacuum). The present (co)polymer may be analyzed and/or characterized by size exclusion chromatography, in accordance with known procedures.

The syndiotactic content of PMMA prepared by the present process at 25° C. is moderately high. The syndiotacticity can be increased by conducting the reaction at a lower temperature.

Control of molecular weight is possible, and is optimal when polymerization is performed immediately after the formation of the phosphonium-containing initiator. The optimum control of molecular weight is best provided using a Flow Tube Reactor (Gerner, F., Höcker, H., Muller, A., Schulz, G. *Eur. Polym. J.* 1984, 20, 349). However, molecular weight control can be somewhat empirically derived for a given initiator and initiator-to-monomer ratio.

A continuous flow reactor system (such as those conventional continuous flow reactors known in the art) will also help to overcome potential problems with bulk polymerization, which may include, for example, generation of an appreciable amount of heat. In a continuous flow system, the heat of reaction may be dissipated more efficiently than in a bulk system, where some contents of the reaction mixture may be relatively far removed from a heat-exchange surface.

The copolymers produced by the present method are "monodisperse"; that is, the copolymers have a narrow molecular weight distribution. In its broadest sense, a "monodisperse" copolymer has a ratio of weight average molecular weight to number average molecular weight ($M_w/M_n$) of 2.0 or less, more preferably of 1.5 or less, and most preferably of 1.1 or less.

The number average molecular weight of copolymer produced by the present method depends linearly on the conversion.

A particularly suitable initiator for use in the present invention is the phosphonium salt of isobutyl alcohol (2-methyl-1-propanol). The advantage of this initiator is that it has approximately the same structure of the monomer units of the corresponding methacrylate copolymer.

Having generally described this invention, a further understanding can be obtained by reference to certain specific examples which are provided herein for purposes of illustration only and are not intended to be limiting unless otherwise specified.

EXAMPLE

Reagents and Solvents

The work was carried out in a glove box under nitrogen.

THF was titrated with tritylpotassium/THF solution to a persistent red color and then recondensed under reduced pressure.

Triphenylmethane was dried for 8 h under reduced pressure and then admixed in THF with Na—K alloy. After 4 h stirring, the remaining metal was filtered off and the concentration of $Ph_3CK$/THF solution was determined by titration of acetanilide as 0.146 mol/l.

9-Ethylfluorene was predried over alumina beads, diluted with THF and reacted with nBuLi or with potassium to form 9-EFluK or 9-EFLi.

The methyl methacrylate was purified by introduction of nitrogen and storage over alumina, followed by stirring over $CaH_2$ and subsequent recondensation under reduced pressure.

The $Ph_4PCl$ was first dried for about 8 h at about 100° C. in a high vacuum. The $Ph_4PCl$ thus predried was then slurried up in the THF and titrated with tritylpotassium/THF solution at −15° C. to a red color. The white $Ph_4PCl$ was then filtered off and subsequently dried under reduced pressure.

Polypolymerization

The initiator was prepared in situ by adding the solution of $(iPr)_2N^-Li^+$ in THF to a suspension of an excess of $Ph_4PCl$ in 30 ml of THF. After 10 min. stirring at −15° C., about 0.8 ml of MMA (about 2.7% by volume of monomer) was added to the deep-red initiator solution. The temperature rose to about −8° C. within a few seconds, only to return back to the bath temperature within a few minutes. The polymerization was stopped with methanol/acetic acid, and the deep-red color disappeared. The copolymer was precipitated with methanol or petroleum ether, filtered off and dried under reduced pressure. The GPC measurements were carried out in relation to PMMA standards.

The following results were obtained:

| | |
|---|---|
| $M_n$ theoretical | 3400 g/mol |
| $M_n$ GPC | 5800 g/mol |
| $M_w/M_n$ | 1.48 |
| Tacticity triads | 66% |

What is claimed is:

1. A method for producing a (co)polymer, which comprises:

reacting an anionically polymerizable monomer of the formula:

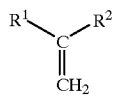

with an initiator of the formula

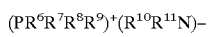

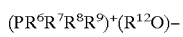

or

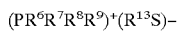

at a temperature of from −78° C. to 40° C., in a solvent in which the initiator at least partially dissolves and which does not quench the reaction, for a length of time sufficient to polymerize the monomer(s) and form a reaction mixture, wherein:

$R^1$ is selected from the group consisting of H, CN, straight-chain or branched alkyl of from 1 to 6 carbon atoms which may be substituted with from 1 to (2n+1) halogen atoms, straight-chain or branched alkenyl of from 2 to 6 carbon atoms which may be substituted with from 1 to (2n−1) halogen atoms, straight-chain or branched alkynyl of from 2 to 6 carbon atoms which may be substituted with from 1 to (2n−3) halogen atoms, and aryl, where n is the number of carbon atoms in the alkyl, alkenyl or alkynyl group; and $R^2$ is independently selected from the group consisting of CN, C(=X)$R^3$, C(=X)N$R^4R^5$ and heterocyclic rings capable of stabilizing an α-anion, where X is NR, O or S, R being $C_1$–$C_{20}$ alkyl; $R^3$ is alkyl of from 1 to 20 carbon atoms, alkoxy of from 1 to 20 carbon atoms or alkylthio of from 1 to 20 carbon atoms; and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl, and any pair of $R^6$, $R^7$, $R^8$ and $R^9$ may be joined to form a ring, including the possibility that both pairs of $R^6$–$R^9$ may be joined to form a ring, $R^{10}$ and $R^{11}$ are independently alkyl of from 1 to 20 carbon atoms, cycloalkyl of from 3 to 10 carbon atoms, an aryl group, a trialkylsilyl group or an electronegative group, or $R^{10}$ and $R^{11}$ may be joined together to form a heterocycle, and $R^{12}$ is independently H, straight-chain or branched alkyl of from 1 to 20 carbon atoms or cycloalkyl of from 3 to 10 carbon atoms, straight-chain or branched alkenyl of from 2 to 20 carbon atoms, straight-chain or branched alkynyl of from 2 to 20 carbon atoms, aryl, aralkyl or a (co)polymer radical;

$R^{13}$ is independently $R^{12}$, straight-chain or branched alkenyl of from 2 to 20 carbon atoms, or straight-chain or branched alkynyl of from 2 to 20 carbon atoms;

quenching the reaction mixture with an acyl halide, an acid anhydride or a substance containing an active hydrogen atom to form a (co)polymer; and isolating the formed (co)polymer.

2. The method of claim 1, wherein said formed (co)polymer has a weight average or number average molecular weight of from 500 g/mol to 300,000 g/mol.

3. The method of claim 1, wherein said formed (co)polymer has a weight average molecular weight ($M_w$)/number average molecular weight ($M_n$) ratio of 2.0 or less.

4. The method of claim 1, wherein said anionically polymerizable monomer is selected from the group consisting of (meth)acrylate esters of $C_1$–$C_{20}$ alcohols, acrylonitrile, cyanoacrylate esters of $C_1$–$C_{20}$ alcohols, didehydromalonate esters of $C_1$–$C_6$ alcohols, vinyl pyridines, vinyl N-alkylpyrroles, vinyl oxazoles, vinyl thiazoles, vinyl pyrimidines and vinyl imidazoles, vinyl $C_1$–$C_{14}$-alkyl ketones in which the α-carbon atom of the alkyl group does not bear a hydrogen atom, vinyl aryl ketones and styrenes bearing electron-donating and electron-withdrawing groups on the phenyl ring.

5. The method of claim 1, wherein $R^6$, $R^7$, $R^8$ and $R^9$ are independently phenyl, naphthyl, phenyl having from 1 to 5 substituents or naphthyl having from 1 to 7 substituents, the substituents being independently selected from the group consisting of alkyl of from 1 to 6 carbon atoms, alkoxy of from 1 to 6 carbon atoms, alkylthio of from 1 to 6 carbon atoms and $NR^{14}R^{15}$, in which $R^{14}$ and $R^{15}$ are independently alkyl of from 1 to 6 carbon atoms.

6. The method of claim 1, wherein:

one of $R^{10}$ and $R^{11}$ is selected from the group consisting of straight-chain or branched alkyl of from 1 to 6 carbon atoms, trimethylsilyl, dimethyl-t-butylsilyl, dimethyl-t-hexylsilyl, phenyl or phenyl having from 1 to 3 substituents selected from the group consisting of alkyl of from 1 to 6 carbon atoms, alkoxy of from 1 to 4 carbon atoms, phenyl and halogen, and the remaining one of $R^{10}$ and $R^{11}$ in selected from the group consisting of —C(O)OR, —C(O)H, —C(O)N(R)$_2$, —C(O)SR, —CN, —S(O)R, —SO$_2$R, —SO$_3$R, —NO$_2$, —P(O)(OR)$_2$, —P(O)(R)$_2$, —P(O)(OR)(R), —P(O)(OR'O), —P(O)(NR$^2$)(R), —P(O)(NR$^2$)2 and —P(O)([NR]R'[NR]), where R is (independently if more than one R group is present) $C_1$–$C_6$ alkyl, benzyl or phenyl, and R' is $C_2$–$C_4$ alkylene or 1,2-phenylene.

7. The method of claim 1, wherein $R^{13}$ is a group of the formula —CR$^{16}$=CR$^{17}$R$^{18}$, where R$^{16}$, R$^{17}$ and R$^{18}$ independently are H, alkyl, aryl, alkoxy or phenoxy, and more preferably, H, alkyl of from 1 to 6 carbon atoms, phenyl, or phenyl having from 1 to 3 substituents selected from the group consisting of alkyl of from 1 to 6 carbon atoms, alkoxy of from 1 to 4 carbon atoms, phenyl and halogen.

8. The method of claim 1, wherein $R^{10}$ and $R^{11}$ are joined together to form a heterocyclic ring selected from the group consisting of:

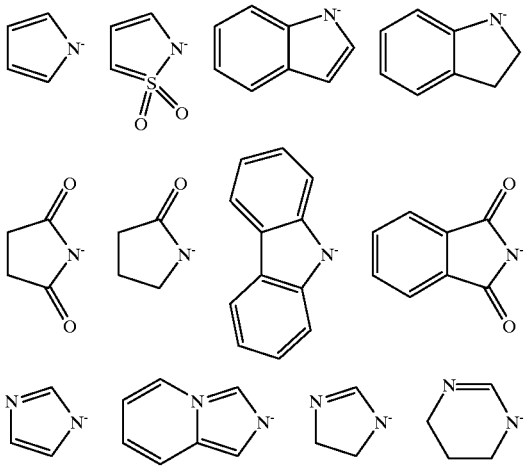

which may have one or more alkyl, phenyl, vinyl, halogen, nitro or cyano substituents, which may be attached in each case to one or more of the different carbon atoms of the heterocyclic ring.

9. A block copolymer of the formula:

$R^{11"}(NR^{10}\text{-}A\text{-}B)_x$ $R^{12"}(O\text{-}A\text{-}B)_x$ $R^{13"}(S\text{-}A\text{-}B)_x$ where A is a (co)polymer block produced by anionic polymerization of one or more monomers of the formula:

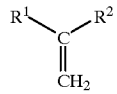

wherein $R^1$ is selected from the group consisting of H, CN, straight-chain or branched alkyl of from 1 to 6 carbon atoms which may be substituted with from 1 to (2n+1) halogen atoms, straight-chain or branched alkenyl of from 2 to 6 carbon atoms which may be substituted with from 1 to (2n–1) halogen atoms, straight-chain or branched alkynyl of from 2 to 6 carbon atoms which may be substituted with from 1 to (2n–3) halogen atoms, and aryl, where n is the number of carbon atoms in the alkyl, alkenyl or alkynyl group; and $R^2$ is independently selected from the group consisting of CN, C(=X)R$^3$, C(=X)NR$^4$R$^5$ and heterocyclic rings capable of stabilizing an α-anion, where X is NR, O or S, R being $C_1$–$C_{20}$ alkyl; R$^3$ is alkyl of from 1 to 20 carbon atoms, alkoxy of from 1 to 20 carbon atoms or alkylthio of from 1 to 20 carbon atoms; and R$^4$ and R$^5$ are independently alkyl of from 1 to 20 carbon atoms or are joined together to form an alkylene group of from 2 to 5 carbon atoms, thus forming a 3- to 6-membered ring;

B comprises one or more distinct (copolymer blocks produced by anionic polymerization of one or more monomers of the formula:

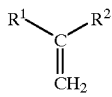

wherein $R^1$ and $R^2$ are as defined above;
$R^{10}$ is alkyl of from 1 to 20 carbon atoms, an aryl group, a trialkylsilyl group or an electronegative group; and
$R^{11"}$, $R^{12"}$ and $R^{13"}$ are independently a mono- or multi-valent alkyl, cycloalkyl, aryl or aralkyl radical, in which the valency is equal to x, and which may be substituted with one or more alkyl, cycloalkyl, halogen, phenyl, nitro or electron-withdrawing groups; and
x is at least one.

10. The block copolymer of claim 9, wherein said formula is selected from the group consisting of

B-A-($R^{10}NR^{11'}NR^{10}$)-A-B

B-A-($OR^{12'}O$)-A-B and

B-A-($SR^{13'}S$)-A-B where $R^{11'}$, $R^{12'}$ and $R^{13'}$ are independently a divalent alkylenyl, cycloalkylenyl, arylenyl or aralkylenyl radical, which may be substituted with one or more alkyl, cycloalkyl, halogen, phenyl, nitro or electron-withdrawing groups.

11. A method for preparing a branch copolymer, comprising:
reacting at least one anionically polymerizable monomer of the formula:

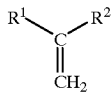

with an initiator of the formula

[($PR^6R^7R^8R^9$)$^+$]$_x$$R^{11"}$—(—N$^-$$R^{10}$)$_x$

[($PR^6R^7R^8R^9$)$^+$]$_x$$R^{12"}$—(—O—)$_x$ or

[($PR^6R^7R^8R^9$)$^+$]$_x$ $R^{13"}$—(—S—)$_x$ at a temperature of from −78° C. to 40° C., in a solvent in which the initiator at least partially dissolves and which does not quench the reaction, for a length of time sufficient to polymerize the first monomer, wherein:
$R^1$ is selected from the group consisting of H, CN, alkyl of from 1 to 6 carbon atoms (which may be halogenated as described above) and aryl,
$R^2$ is independently selected from the group consisting of CN, C(=X)$R^3$, C(=X)NR$^4$R$^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl (wherein any pair of $R^6$, $R^7$, $R^6$ and $R^9$ may be joined to form a ring, including the possibility that both pairs of $R^6$–$R^9$ may be joined to form a ring),
$R^{10}$ is alkyl of from 1 to 20 carbon atoms, cycloalkyl of from 3 to 10 carbon atoms, an aryl group, a trialkylsilyl group or an electronegative group,
$R^{11"}$, $R^{12"}$ and $R^{13"}$ are independently a mono- or multi-valent alkyl, cycloalkyl, aryl or aralkyl radical, in which the valency is equal to x, and which may be substituted with one or more alkyl, cycloalkyl, halogen, phenyl, nitro or electron-withdrawing groups, or
$R^{10}$ and $R^{11"}$ may be joined together to form a heterocycle, and
x is at least 3,
to form a branch (co)polymer intermediate;
quenching the branch (co)polymer intermediate with an acyl halide, an acid anhydride or a substance containing an active hydrogen atom to form a branch (co)polymer; and
isolating the formed branch (co)polymer.

12. A method for preparing a triblock copolymer, comprising:
reacting at least one anionically polymerizable monomer of the formula:

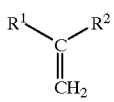

with an initiator of the formula

[($PR^6R^7R^8R^9$)$^+$]$_2$ ($R^{10}NR^{11'}NR^{10}$)$^{2-}$

[($PR^6R^7R^8R^9$)$^+$]$_2$ ($OR^{12'}O$)$^{2-}$ or

[($PR^6R^7R^8R^9$)$^+$]$_2$ ($SR^{13'}S$)$^{2-}$ at a temperature of from −78° C. to 40° C., in a solvent in which the initiator at least partially dissolves and which does not quench the reaction, for a length of time sufficient to polymerize the first monomer, wherein:
$R^1$ is selected from the group consisting of H, CN, straight-chain or branched alkyl of from 1 to 6 carbon atoms which may be substituted with from 1 to (2n+1) halogen atoms, straight-chain or branched alkenyl of from 2 to 6 carbon atomg which may be substituted with from 1 to (2n−1) halogen atoms, straight-chain or branched alkynyl of from 2 to 6 carbon atoms which may be substituted with from 1 to (2n−3) halogen atoms, and aryl, where n is the number of carbon atoms in the alkyl, alkenyl or alkynyl group;
$R^2$ is independently selected from the group consisting of CN, C(=X)$R^3$, C(=X)NR$^4$R$^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl (wherein any pair of $R^6$, $R^7$, $R^8$ and $R^9$ may be joined to form a ring, including the possibility that both pairs of $R^6$–$R^9$ may be joined to form a ring), $R^{10}$ is alkyl of from 1 to 20 carbon atoms, cycloalkyl of from 3 to 10 carbon atoms, an aryl group, a trialkylsilyl group or an electronegative group, $R^{11'}$, $R^{12'}$ and $R^{13'}$ are independently a divalent alkylenyl, cycloalkylenyl, arylenyl or aralkylenyl radical, which may be substituted with one or more alkyl, cycloalkyl, halogen, phenyl, nitro or electron-withdrawing groups, or $R^{10}$ and $R^{11'}$ may be joined together to form a heterocycle;

adding a second monomer of the formula:

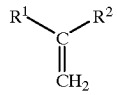

where $R^1$ and $R^2$ are as defined above at a temperature of from −78° C. to 40° C., and reacting for a length of time sufficient to form a (co)polymer block distinct from block A and thus form a triblock (co)polymer intermediate, quenching the triblock (co)polymer intermediate with an acyl halide, an acid anhydride or a substance containing an active hydrogen atom to form a triblock (co)polymer; and isolating the formed triblock (co)polymer.

13. A method for preparing a block copolymer, comprising the steps of:

anionically polymerizing one or more anionically polymerizable monomers to prepare a (co)polymeric anion;

reacting the (co)polymer anion with a compound of the formula

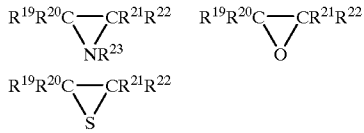

to form a (co)polymer-amide, (co)polymer-oxide or (co)polymer-sulfide anion, where $R^{23}$ is acyl and $R^{19}$, $R^{20}$, $R^{21}$ and $R^{22}$ are independently selected from the group consisting of H, straight-chain or branched alkyl of from 1 to 20 carbon atoms, straight-chain or branched alkyl of from 1 to 20 carbon atoms substituted with from 1 to (2n+1) halogen atoms (where n is the number of carbon atoms in the alkyl group), straight-chain or branched alkenyl of from 2 to 20 carbon atoms, straight-chain or branched alkenyl of from 2 to 20 carbon atoms substituted with from 1 to (2n−1) halogen atoms (where n is the number of carbon atoms in the alkenyl group), straight-chain or branched alkynyl of from 2 to 20 carbon atoms, straight-chain or branched alkynyl of from 2 to 20 carbon atoms substituted with from 1 to (2n−3) halogen atoms (where n is the number of carbon atoms in the alkynyl group), aryl, aralkyl, heterocyclyl, halogen, and cyano, or any two of $R^{19}$, $R^{20}$, $R^{21}$ and $R^{22}$ may be joined to form an alkylenyl group of from 1 to 6 carbon atoms and thus form a cycloalkylenyl ring of from 3 to 8 members;

metathesizing the (co)polymer-amide, (co)polymer-oxide or (co)polymer-sulfide anion with a phosphonium salt of the formula:

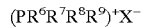

where $R^6$, $R^7$, $R^8$ and $R^9$ are independently alkyl of from 1 to 20 carbon atoms, aryl or aralkyl and wherein any pair of $R^6$, $R^7$, $R^8$ and $R^9$ may be joined to form a ring, including the possibility that both pairs of $R^6$–$R^9$ may be joined to form a ring, and X is an inorganic anion, to provide an initiator;

reacting the initiator with one or more monomers of the formula:

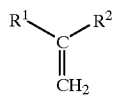

at a temperature of from −78° C. to 40° C., in a solvent in which the initiator at least partially dissolves and which does not quench the reaction, for a length of time sufficient to polymerize the monomer, to form a reaction mixture, wherein:

$R^1$ is selected from the group consisting of H, CN, straight-chain or branched alkyl of from 1 to 6 carbon atoms which may be substituted with from 1 to (2n+1) halogen atoms, straight-chain or branched alkenyl of from 2 to 6 carbon atoms which may be substituted with from 1 to (2n−1) halogen atoms, straight-chain or branched alkynyl of from 2 to 6 carbon atoms which may be substituted with from 1 to (2n−3) halogen atoms, and aryl, where n is the number of carbon atoms in the alkyl, alkenyl or alkynyl group, and $R^2$ is independently selected from the group consisting of CN, C(=X)$R^3$, C(=X)NR$^4$P$^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

quenching the reaction mixture with an acyl halide, an acid anhydride or a substance containing an active hydrogen atom to form a block (co)polymer; and isolating the formed block (co)polymer.

14. The method of claim 13, wherein said anionically polymerizable monomer is selected from the group consisting of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene, or mixtures thereof.

15. The method of claim 13, wherein $R^{19}$ and $R^{20}$ are H, and $R^{21}$ and $R^{22}$ are independently selected from the group consisting of H, straight-chain or branched alkyl of from 1 to 10 carbon atoms (which may be substituted with fromnl to (2n+1) halogen atoms, where n is the number of carbon atoms in the alkyl group), straight-chain or branched alkenyl of from 2 to 6 carbon atoms (which may be substituted with from 1 to (2n−1) halogen atoms, where n is the number of carbon atoms in the alkenyl group), phenyl, or phenyl having from 1 to 3 substituents selected from the group consisting of alkyl of from 1 to 6 carbon atoms, alkoxy of from 1 to 4 carbon atoms, phenyl and halogen.

16. A block copolymer of the formula:

(co)polymer-$(CR^{19}R^{20}CR^{21}R^{22}NR^{23})$-A (co)polymer-$(CR^{19}R^{20}CR^{21}R^{22}O)$-A or (co)copolymer-$(CR^{19}R^{20}CR^{21}R^{22}S)$-A where:
  the (co)polymer is one produced by anionic polymerization;
  $R^{19}$, $R^{20}$, $R^{21}$ and $R^{22}$ are independently selected from the group consisting of H, straight-chain or branched alkyl of from 1 to 20 carbon atoms, straight-chain or branched alkyl of from 1 to 20 carbon atoms substituted with from 1 to (2n+1) halogen atoms (where n is the number of carbon atoms in the alkyl group), straight-chain or branched alkenyl of from 2 to 20 carbon atoms, straight-chain or branched alkenyl of from 2 to 20 carbon atoms substituted with from 1 to (2n−1) halogen atoms (where n is the number of carbon atoms in the alkenyl group), straight-chain or branched alkynyl of from 2 to 20 carbon atoms, straight-chain or branched alkynyl of from 2 to 20 carbon atoms substituted with from 1 to (2n−3) halogen atoms (where n is the number of carbon atoms in the alkynyl group), aryl, aralkyl, heterocyclyl, halogen, and cyano, or any two of $R^{19}$, $R^{20}$, $R^{21}$ and $R^{22}$ may be joined to form an alkylenyl group of from 1 to 6 carbon atoms and thus form a cycloalkylenyl ring of from 3 to 8 members;
  $R^{23}$ is acyl; and
  A is one or more distinct (co)polymer blocks of one or more monomers of the formula:

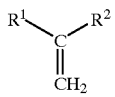

where:
  $R^1$ is selected from the group consisting of H, CN, straight-chain or branched alkyl of from 1 to 6 carbon atoms which may be substituted with from 1 to (2n+1) halogen atoms, straight-chain or branched alkenyl of from 2 to 6 carbon atoms which may be substituted with from 1 to (2n−1) halogen atoms, straight-chain or branched alkynyl of from 2 to 6 carbon atoms which may be substituted with from 1 to (2n−3) halogen atoms, and aryl, where n is the number of carbon atoms in the alkyl, alkenyl or alkynyl group, and
  $R^2$ is independently selected from the group consisting of CN, $C(=X)R^3$, $C(=X)NR^4R^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring.

17. The block (co)polymer of claim 16, wherein each block has weight average molecular weight or number average molecular weight of from 300 to 500,000 g/mol, more preferably 500 to 300,000 g/mol.

18. The block (co)polymer of claim 16, having a $M_w/M_n$ value of less than or equal to 2.0.

19. The block (co)polymer of claim 16, wherein the (co)polymer is one produced by anionic polymerization of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene, or mixtures thereof.

20. The method of claim 1, wherein the anionically polymerizable monomer and the initiator are reacted at from −20° C. to 30° C.

21. The method of claim 1, wherein the anionically polymerizable monomer and the initiator are reacted at from 0° C. to 25° C.

22. The method of claim 1, wherein the anionically polymerizable monomer and the initiator are reacted at from 15° C. to 25° C.

* * * * *

UNITED STATES PATENT AND TRADEMARK OFFICE
CERTIFICATE OF CORRECTION

PATENT NO. : 6,303,722 B1
DATED : October 16, 2001
INVENTOR(S) : Mehler et al.

It is certified that error appears in the above-identified patent and that said Letters Patent is hereby corrected as shown below:

Column 17,
Line 53, "in" should be -- is --.
Line 57, "-P(O)(NR$^2$)(R), -P(O)(NR$^2$)2" should be -- P(O)(NR$_2$)(R), -P(O)(NR$_2$)$_2$ --.

Column 18,
Line 65, "(copolymer" should be -- (co)polymer --.

Column 20,
Line 3, "R$^6$" should be -- R$^8$ --.

Column 22,
Line 37, "C(=X)NR$^4$P$^5$" should be -- C(=X)NR$^4$R$^5$ --.
Line 59, "fromn1" should be -- from 1 --.

Signed and Sealed this

Thirtieth Day of April, 2002

Attest:

*Attesting Officer*

JAMES E. ROGAN
*Director of the United States Patent and Trademark Office*